United States Patent
Pyles et al.

(10) Patent No.: US 6,949,127 B2
(45) Date of Patent: Sep. 27, 2005

(54) PROCESS FOR MAKING DYED ARTICLES

(75) Inventors: Robert A. Pyles, Bethel Park, PA (US); Rick L. Archey, Pleasant Hills, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 10/796,523

(22) Filed: Mar. 9, 2004

(65) Prior Publication Data

US 2004/0168268 A1 Sep. 2, 2004

Related U.S. Application Data

(62) Division of application No. 10/106,788, filed on Mar. 26, 2002, now Pat. No. 6,733,543.

(51) Int. Cl.$^7$ .............................. D06P 1/60; D06P 1/64
(52) U.S. Cl. .................. 8/506; 8/509; 8/510; 8/512; 8/514; 8/515; 8/516; 8/609; 8/611
(58) Field of Search ................ 8/506, 509, 510, 8/512, 514, 515, 516, 609, 611

(56) References Cited

U.S. PATENT DOCUMENTS

| 3,514,246 A | * | 5/1970 | Bianco et al. ................ 8/506 |
| 3,532,454 A | | 10/1970 | Kuhr et al. ..................... 8/4 |
| 3,630,664 A | | 12/1971 | Nentwig et al. ............. 8/173 |
| 4,076,496 A | | 2/1978 | Hamano ........................ 8/4 |
| 4,812,142 A | * | 3/1989 | Brodmann .................. 8/512 |
| 5,052,337 A | | 10/1991 | Talcott et al. .............. 118/667 |
| 5,453,100 A | * | 9/1995 | Sieloff ......................... 8/479 |

FOREIGN PATENT DOCUMENTS

| JP | 51-60264 | 5/1976 |
| JP | 80017156 | 5/1980 |
| JP | 56-31085 | 3/1981 |
| JP | 2000-248476 | 9/2000 |
| WO | 00/14325 | 3/2000 |

OTHER PUBLICATIONS

Database WPI, Derwent Publications Ltd., London, GB; XP002252199, "Solvent-based ink composition" & JP 04 139273 A (Pentel KK), May 13, 1992 abstract.

* cited by examiner

*Primary Examiner*—Margaret Einsmann
(74) *Attorney, Agent, or Firm*—Joseph C. Gil; Aron Preis

(57) ABSTRACT

A process of dyeing a molded article is disclosed. The process entails immersing at least a portion of the article in a dyeing bath, retaining the portion in the bath for a period of time sufficient to allow an amount of dye to diffuse into the article, and removing said article from the bath. The molded article comprises a polymeric resin such as (co)polyester, (co)polycarbonates, acrylonitrile-butadiene-styrene, polyamide, polyurethane, polyalkyl(meth)-acrylate, allyldiglycol carbonate and styrene copolymers. The dyeing bath contains in addition to dye, water, a plasticizing agent and a leveling agent.

8 Claims, No Drawings

PROCESS FOR MAKING DYED ARTICLES

This application is a divisional of U.S. patent application Ser. No. 10/106,788, filed Mar. 26, 2002, now U.S. Pat. No. 6,733,543.

FIELD OF THE INVENTION

The present invention relates to plastic articles and more particularly to colored articles, and to a process for their preparation.

SUMMARY OF THE INVENTION

A process for tinting of articles molded from a polymeric resin is disclosed. Preferably, the article is molded from polycarbonate and the process entails immersing the molded article in a dye bath that contains (i) at least one leveling agent, (ii) at least one plasticizing agent and (iii) water.

The method is especially useful in the manufacture of tinted lenses.

BACKGROUND OF THE INVENTION

Articles molded of polycarbonate are well known. The utility and method for making colored articles that are prepared from pigmented polycarbonate compositions are well known. Also known are processes for dyeing articles molded of resins, including polycarbonates, and including lenses that have been tinted by immersion in special pigmenting mixtures. Among the advantages attained by such tinting of lenses, mention has been made of reduced light transmission and mitigation of glare.

U.S. Pat. No. 4,076,496 disclosed a dye bath composition suitable for dyeing hard-coated polarized lenses. The composition of the bath included a dye and as a solvent, a mixture of glycerol and ethylene glycol, optionally, with a minor proportion of water or other organic solvent.

U.S. Pat. No. 5,453,100 disclosed polycarbonate materials that are dyed by immersion into a mixture of dye or pigment dissolved in a solvent blend. The blend is made up of an impregnating solvent that attacks the polycarbonate and allows the impregnation of the dye or pigment and a moderating solvent that mitigates the attack of the impregnating solvent. The impregnating solvent thus disclosed includes at least one solvent selected from dipropylene glycol monomethyl ether, tripropylene glycol monomethyl ether and propylene glycol monomethyl ether. The moderating organic solvent includes at least one solvent selected from propylene glycol, 1,4-butane diol or ethylene glycol monobutyl ether.

PCT/CA99/00803 (WO 0014325) disclosed tinting plastic articles by immersion in an aqueous dispersion and exposing the dispersion and immersed article to microwave radiation. JP 53035831 B4 disclosed polycarbonate moldings that are dyed in aqueous dispersion containing dispersed dyes and diallyl phthalate, o-phenylphenol or benzylalcohol. Also, JP 55017156 disclosed aliphatic polycarbonate lenses that are colored with liquor containing dyes and water. JP 56031085 (JP-104863) disclosed compositions containing a disperse dye in an aliphatic ketone and polyhydric alcohol said to be useful in coloring polycarbonate films at room temperature. JP2000248476 disclosed a molded polycarbonate bolt that was dyed with a solution containing dyes, an anionic leveling agent and then treated with a solution containing thiourea dioxide.

U.S. Pat. No. 4,812,142 disclosed polycarbonate articles dyed at a temperature of 200° F. or above in a dye solvent having a boiling point of at least 350° F., and U.S. Pat. No. 3,514,246 disclosed immersing molded polycarbonate articles in an emulsified dye liquor which contains a water insoluble dyestuff, an oil-soluble surface active agent dissolved in an aliphatic hydrocarbon solvent and water. The procedure was repeated with similar results where the surfactant was replaced by a poly(oxyethylene) derivative. U.S. Pat. No. 3,532,454 disclosed dyeing of polycarbonate fibers with a dye composition that contains at least one of alkoxyalkylbenzyl ether, alkylene glycol di-benzyl ether, benzoic acid alkoxyalkyl ester or phenoxy acetic acid-alkoxyalkyl ester. U.S. Pat. No. 3,630,664 disclosed a dye bath that required the presence of a carbonate conforming to a specific formula, e.g., ethyl-benzyl-carbonate.

DETAILED DESCRIPTION OF THE INVENTION

The inventive method and the dye bath composition of this invention are useful for dyeing plastic articles molded of a variety of resinous molding compositions. The suitable resins include both thermoplastic and thermosetting compositions. Among the suitable resins, mention may be made of (co)polyesters, (co)polycarbonates (including aromatic and aliphatic polycarbonate such as allyldiglycol carbonate, e.g., trade name CR-39), polyesterpolycarbonate copolymers, styrenic copolymers such as SAN and acrylonitrile-butadiene-styrene (ABS), acrylic polymers such as polymethylmethacrylate and ASA, polyamide, and polyurethane and blends of one or more of these resins. Particularly, the invention is applicable to polycarbonates, and most particularly to thermoplastic aromatic polycarbonates.

The molding compositions useful in molding the articles that are suitable for use in the inventive process may include any of the additives that are known in the art for their function in these compositions and include at least one of mold release agents, fillers, reinforcing agents in the form of fibers or flakes most notably metal flakes such as aluminum flakes, flame retardant agents, pigments and opacifying agents such as titanium dioxide and the like, light-diffusing agents such as polytetrafluoroethylene, zinc oxide, Paraloid EXL-5136 available from Rohm and Haas and crosslinked polymethylmethacrylate minispheres (such as n-licrospheres from Nagase America) UV-stabilizers, hydrolytic stabilizers and thermal stabilizers.

Articles to be dyed in accordance with the inventive process may be produced conventionally by methods that have long been practiced in the plastics arts and include articles molded by compression molding, injection molding, rotational molding, extrusion, injection and extrusion blow molding, and casting, the method of producing the articles is not critical to the practice of the inventive process. The articles may be any of a vast variety of useful items and include computer face-plates, keyboards, bezels and cellular phones, color coded packaging and containers of all types, including ones for industrial components, residential and commercial lighting fixtures and components therefor, such as sheets, used in building and in construction, tableware, including plates, cups and eating utensils, small appliances and their components, optical and sun-wear lenses, as well as decorative films including such films that are intended for use in film insert molding.

Polymer resins particularly suitable in the present context include one or a mixture of two or more resins selected from the group consisting of polyester, polycarbonate, polyester-polycarbonate copolymer, acrylonitrile-butadiene-styrene (ABS), polyamide, polyurethane, polymethylmethacrylate and styrenic copolymer. While styrenic copolymers, most notable styrene-acrylonitrile copolymers are thus suitable, the inventive process is not applicable for tinting of homopolystyrene.

According to the present invention, the molded article to be tinted, preferably a lens, is immersed in the dyeing bath mixture for a time and at temperature sufficient to facilitate at least some impregnation, or diffusion, of the dye into the bulk of the article thus effecting tinting thereof. For tinting articles made of aromatic polycarbonate, the immersion may be carried out at a temperature of about 90 to 99° C. and the immersion time is typically less than 1 hour, most preferably in the range of 1 to 15 minutes. However, due to the efficiency of dye up-take, thermoplastic resins that have low heat distortion temperature may be dyed at lower temperatures than polycarbonate. For example, polyurethanes and SAN may be readily dyed using the solution composition that is typically used for tinting polycarbonate, heated to only about 60° C. and 90° C., respectively. The tinted article is then withdrawn at a desired rate, including a rate sufficient to effect a tinting gradient, the portion of the article that remains in the mixture longest is impregnated with the most dye so that it exhibits the darkest color tint.

The dyeing bath mixture contains:

(a) water in an amount of 50 to 90, preferably 62.5 to 85, most preferably 70 to 77.5 pbw (percent by weight relative to the weight of the dyeing bath mixture);

(b) an amount of dye sufficient to effect tinting, generally 0.1 to 15, preferably 0.3 to 5, most preferably 0.4 to 2 pbw;

(c) an amount of 2.5 to 20, preferably 5 to 12.5, most preferably 7.5 to 10 pbw of at least one plasticizing agent conforming to $R'-[(O(CH_2)_m)_n-]OH$ where R' is an ethyl, propyl or butyl radical,
m is 2, 3 or 4, and
n is 1, 2 or 3
with the proviso that where R' is butyl m is 2 or 4, and (d) an amount of 5 to 30, preferably 10 to 25, most preferably 15 to 20 pbw of at least one leveling agent conforming structurally to $H-[(O(CH_2)_m)_n-]OH$ where m is 2, 3 or 4 and
n is 1, 2, or 3.

A particularly suitable plasticizing agent is a member selected from the group consisting of ethylene glycol butyl ether, diethylene glycol ethylether, diethylene glycol butylether, propylene glycol propylether, dipropylene glycol propyl ether and tripropylene glycol propylether.

A particularly suitable leveling agent is a member selected from the group consisting of diethylene glycol, triethylene glycol and 1,4 butandiol.

The dyes to be used in accordance with the invention are conventional and include fabric dyes and disperse dyes as well as dyes that are known in the art as being suitable for tinting of polycarbonates.

Examples of suitable disperse dyes include Disperse Blue #3, Disperse Blue #14, Disperse Yellow #3, Disperse Red #13 and Disperse Red #17. The classification and designation of the dyes recited in this specification are in accordance with "The Colour Index", 3rd Edition published jointly by the Society of Dyes and Colors and the American Association of Textile Chemists and Colorists (1971), incorporated herein by reference. Dyestuffs can generally be used either as a sole dye constituent or as a component of a dye mixture depending upon the color desired. Thus, the term dye as used herein includes dye mixture.

The dye class known as "Solvent Dyes" is useful in the practice of the present invention. This dye class includes the preferred dyes Solvent Blue 35, Solvent Green 3 and Acridine Orange Base. However, Solvent Dyes, in general, do not color as intensely as do Disperse Dyes.

Among the suitable dyes, special mention is made of water-insoluble azo, diphenylamine and anthraquinone compounds. Especially suitable are acetate dyes, dispersed acetate dyes, dispersion dyes and dispersol dyes such as are disclosed in *Colour Index*, $3^{rd}$ Edition, Vol. 2, The Society of Dyers and Colourists, 1971, pp. 2479 and pp. 2187–2743, respectively, all incorporated herein by reference. The preferred dispersed dyes include Dystar's Palanil Blue E-R150 (anthraquinone/Disperse Blue) and DIANIX Orange E-3RN (azo dye/Cl Disperse Orange 25). Note that phenol red and 4-phenylazophenol do not dye polycarbonate in accordance with the inventive process.

The dyes known as "direct dyes" and the ones termed "acid dyes" are not suitable in the practice of the invention for polycarbonate; however, acid dyes are effective with nylon.

The amount of dye used in the mixture can vary; however, only small amounts are typically needed to sufficiently tint an article in accordance with the invention. A typical dye concentration in the bath is 0.4 pbw, but there is considerable latitude in this regard. Generally, dyes may be present in the solvent mixture at a level of about 0.1 to 15 pbw, preferably 0.3 to 0.5 pbw. Where a dye mixture is used and the rates of consumption of the individual components differ one from the others, dye components will have to be added to the bath in such a manner that their proportions in the bath remain substantially constant.

The bath may optionally include an emulsifier in amounts of up to 15 pbw, preferably 0.5 to 5, most preferably 3 to 4 pbw. A suitable emulsifier in the context of the invention is a substance that holds two or more immiscible liquids or solids in suspension (e.g., water and the carrier). Emulsifiers which may be used include ionic, non-ionic, or mixtures thereof. Typical ionic emulsifiers are anionic, including amine salts or alkali salts of carboxylic, sulfamic or phosphoric acids, for example, sodium lauryl sulfate, ammonium lauryl sulfate, lignosulfonic acid salts, ethylene diamine tetra acetic acid (EDTA) sodium salts and acid salts of amines such as laurylamine hydrochloride or poly(oxy-1, 2ethanediylphenyl)alpha-sulfo-omega-hydroxy ether with phenol 1-(methylphenyl)ethyl derivative ammonium salts; or amphoteric, that is, compounds bearing both anionic and cationic groups, for example, lauryl sulfobetaine; dihydroxy ethylalkyl betaine; amido betaine based on coconut acids; disodium N-lauryl amino propionate; or the sodium salts of dicarboxylic acid coconut derivatives. Typical non-ionic emulsifiers include ethoxylated or propoxylated alkyl or aryl phenolic compounds, such as, octylphenoxypolyethyleneoxyethanol or poly(oxy-1,2-ethanediyl)alpha-phenyl-omega-hydroxy, styrenated. The preferred emulsifier is a mixture of $C_{14}$–$C_{18}$ and $C_{16}$–$C_{18}$ ethoxylated unsaturated fatty acids and poly(oxy-1,2-ethanediyl)alpha-sulfo-omega-hydroxy ether with phenol 1-(methylphenyl)ethyl derivative ammonium salts and poly(oxy-1,2-ethanediyl), alpha-phenyl-omega-hydroxy, styrenated.

Emulsifiers, such as disclosed in "Lens Prep II", a commercial product of Brain Power International (BPI) may be used.

According to an embodiment of the present invention, an article molded of the resins suitable in accordance with the invention, preferably molded of a polycarbonate composition, is immersed in the inventive dyeing bath. To reduce processing time, while keeping evaporation losses to a minimum, some dyeing baths may be heated to temperatures below 100° C., preferably below 96° C. In the course of dyeing, in accordance with the present invention, it is preferred that the dyeing bath is at a temperature below that at which the bath is at the state of ebullition. The optimum temperature of the bath is to some degree influenced by the molecular weight of the polycarbonate, its additives and the chemical nature of the dye.

In a preferred embodiment in the tinting of parts made of polycarbonate, a dye that is known to be suitable for compounding with polycarbonate composition is mixed with the plasticizer and leveling agent and water and the optional surfactant to form a dye-bath mixture. In accordance with the invention, the article is immersed in the dyeing bath and withdrawn after only a few minutes to provide a color-tinted product. The length of time in which the article should remain immersed in the bath and the process conditions depends upon the desired degree of tint.

Naturally, higher concentrations of dye and higher temperatures will increase the rate of dyeing.

In order to impart a graded tint, the molded article may be immersed in the dyeing bath and then slowly withdrawn therefrom. A graded tint results because the portion of the article that remains in the mixture longest is impregnated with the most dye.

The present invention may be more fully understood with reference to the examples set forth below. The examples are in no way to be considered as limiting, but instead are provided as illustrative of the invention.

EXAMPLES

The process was demonstrated in reference to an article molded of polycarbonate. The components of the dye bath and their relative amounts are noted in the table below that summarizes the results of the several experiments. The bath was maintained at 95° C. and the molded article to be tinted was then dipped. The part was removed from the bath, rinsed with copious quantities of water to remove any traces of excess dye and dried. The dipping time, dye concentration and mix temperature, may be adjusted to yield colors of the desired shades and density. The table below summarizes the results of several experiments that were carried out in accordance with the present invention. The article tinted in accordance with these experiments was molded of polycarbonate, Makrolon 3107 a homopolycarbonate based on bisphenol A having a MFR of 5–7.5 g/10 min. (in accordance with ASTM D 1238) a product of Bayer Corporation. Light transmission, TLT (%) and haze (%) were determined in accordance with ASTM D 1003. All the articles were dipped in the bath for 10 minutes, except for Example 3 where the time was 30 minutes. The contents of the plasticizer and leveling agent in the bath is reported below in percent by weight relative to the weight of the bath, water made up the remainder. The dye used in all the experiments was Palinil Blue and the amount of the dye was 4 grams per liter of bath, except for Example 16 where the amount of dye was 2 g/liter of bath.

TABLE 1

| Example | Plasticizer (%) | Leveling agent (%) | TLT(%) | Haze (%) | Remarks |
|---|---|---|---|---|---|
| 1 | EGBE[1] 20% | DEG[9] (10%) | 5.1 | 5.2 | WD[11] |
| 2 | EGBE[1] 10% | DEG (5.0%) | 8.0 | 0.9 | WD |
| 3 | EGBE[1] 10% | DEG (5.0%) | 3.5 | 1.0 | WD |
| 4 | EGBE[1] 5% | DEG (2.5%) | 31.0 | 0.7 | WD |
| 5 | DGEE[2] (20%) | DEG (10%) | 77.7 | 1.3 | WD |
| 6 | DGBE[3] (20%) | DEG (10%) | 24.6 | 0.5 | WD |
| 7 | PGEEA[4] (20%) | DEG (10%) | 0.3 | 97.2 | NWD[12] |
| 8 | PGPE[5] (20%) | DEG (10%) | 3.0 | 2.7 | WD |
| 9 | PGPE[5] (10%) | DEG (5.0%) | 4.6 | 1.8 | WD |
| 10 | PGPE[5] (5%) | DEG (2.5%) | 40.8 | 0.9 | Streaky |
| 11 | PGPE[5] (20%) | None | 7.1 | 10.5 | NWD |
| 12 | PGPE[5] (20%) | Butanediol (10%) | 2.8 | 25.6 | WD |
| 13 | PGPE[5] (20%) | TEG[10] (10%) | 5.0 | 38.4 | WD |
| 14 | PGBE[6] (20%) | DEG (10%) | 5.6 | 37.7 | NWD |
| 15 | DPGPE[7] (20%) | DEG (10%) | 11.6 | 10.6 | WD |
| 16 | TPGPE[8] (20%) | DEG (10%) | 31.3 | 1.4 | WD |

EGBE[1]—refers to ethylene glycol butyl ether (available commercially as butyl cellusolve, from Union Carbide Corporation, a Subsidiary of The Dow Chemical Company).
DGEE[2]—refers to diethylene glycol ethyl ether.
DGBE[3]refers to diethylene glycol butyl ether.
PGEEA[4]—refers to propylene glycol ethyl ether acetate.
PGPE[5]—refers to propylene glycol propyl ether.
PGBE[6]—refers to propylene glycol butyl ether.
DPGPE[7]—refers to dipropylene glycol propyl ether.
TPGPE[8]—refers to tripropylene glycol propyl ether.
DEG[9]—refers to diethylene glycol.
TEG[10]—refers to triethylene glycol.
WD[11]—denotes well dispersed.
NWD[12]—denotes "not well dispersed".

As may readily be seen, the tinting, in accordance with the invention, is sensitive to the makeup of the bath, Examples 7 and 14 where largely similar compounds (PGEEA and PGBE respectively) were used in replacement of the inventive plasticizing agent, resulted in poor dispersion of the dye. Also, in Example 10, where the leveling agent was used in an insufficient amount, the result was deemed streaky, and in Example 11 where no leveling agent was used, the dye was deemed to have been poorly dispersed.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A dyed article prepared by a process comprising the steps of
   (i) immersing at least a portion of an article in a dyeing bath maintained at a temperature of 60 to 99°C. and
   (ii) retaining said portion in said bath for a period of time sufficient to allow an amount of dye to diffuse into said article, and (iii) removing said article from said bath,
wherein molded article comprises at least one polymeric resin selected from the group consisting of (co)polyester, (co)polycarbonates, acrylonitrile-butadiene-styrene, polyamide, polyurethane, polyalkyl(meth)acrylate, allyldiglycol carbonate and styrene copolymers, and wherein the bath contains
- (a) 50 to 90 pbw relative to the weight of the bath of water
- (b) 0.1 to 15 pbw of dye
- (c) 2.5 to 20 pbw of at least one plasticizing agent conforming to

where R' is an ethyl, propyl or butyl radical,
m is 2, 3 or 4, and
n is 1, 2 or 3
with the proviso that where R' is butyl m is 2 or 4 and
- (d) 5 to 30 pbw of at least one leveling agent conforming structurally to

where m is 2, 3 or 4 and
n is 1, 2, or 3.

2. The dyed article of claim 1 wherein the bath further contains a surfactant.

3. The dyed article of claim 1 wherein the dye is disperse dye.

4. The dyed article of claim 3 wherein the bath further contains a surfactant.

5. The dyed article of claim 1 wherein the dye is a water-insoluble dye selected from the group consisting of azo, diphenylamine and anthraquinone compounds.

6. The dyed article of claim 1 wherein the resin is aromatic polycarbonate.

7. The dyed article of claim 1 wherein the plasticizing agent is a member selected from the group consisting of ethylene glycol butyl ether, diethylene glycol ethylether, diethylene glycol butylether, propylene glycol propylether, dipropylene glycol propyl ether and tripropylene glycol propylether.

8. The dyed article of claim 1 wherein the leveling agent is a member selected from the group consisting of diethylene glycol, triethylene glycol and 1,4-butanediol.

* * * * *